US006816162B2

(12) United States Patent
Taneja et al.

(10) Patent No.: US 6,816,162 B2
(45) Date of Patent: Nov. 9, 2004

(54) DATA MANAGEMENT TO ENABLE VIDEO RATE ANTI-ALIASING CONVOLUTION

(75) Inventors: Nimita J. Taneja, Castro Valley, CA (US); Nathaniel David Naegle, Pleasanton, CA (US); Michael F. Deering, Los Altos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 236 days.

(21) Appl. No.: 10/200,087

(22) Filed: Jul. 19, 2002

(65) Prior Publication Data

US 2004/0012609 A1 Jan. 22, 2004

(51) Int. Cl.[7] .............................................. G06F 13/00
(52) U.S. Cl. ........................ 345/537; 345/519; 345/544
(58) Field of Search ........................ 345/530, 536–538, 345/501, 531, 519, 544, 502, 558, 557, 639, 640, 611, 615

(56) References Cited

U.S. PATENT DOCUMENTS 5,943,060 A    8/1999  Cosman et al.
6,326,964 B1  12/2001  Snyder et al.
6,417,861 B1 * 7/2002  Deering et al. ............. 345/589
2002/0171656 A1 11/2002  Lavelle et al.

OTHER PUBLICATIONS

Deering & Naegle, "The SAGE Graphics Architecture", paper presented Jul. 25, 2002 at SIGGRAPH 2002, and published in the Proceedings of ACM SIGGRAPH 2002, pp. 683–692, Jul. 2002.

* cited by examiner

Primary Examiner—Kee M. Tung
(74) Attorney, Agent, or Firm—Meyertons Hood Kivlin Kowert & Goetzel, P.C.; Jeffrey C. Hood

(57) ABSTRACT

A system and method is disclosed for management of sample data to enable video rate anti-aliasing convolution. Sample data may be moved simultaneously from a sample buffer to a bin scanline cache and from the bin scanline cache to an array of $N^2$ processor—memory units (e.g. 25 for N=5). Pixel data may be convolved from an N×N sample bin array that may be approximately centered on the pixel location. Since each sample bin contains $N_{s/b}$ samples, $N_{s/b} \times N^2$ samples may be filtered for each pixel (e.g. 400 for N=5 and $N_{s/b}$=16). Each processor—memory unit convolves the sample data for one sample bin in the N×N sample bin array and supports a variety of filter functions. Pixel data may be output to a real time video data stream.

32 Claims, 21 Drawing Sheets

DATA MANAGEMENT TO ENABLE VIDEO RATE ANTI-ALIASING CONVOLUTION

BACKGROUND OF THE INVENTION

1. Field of the Invention

This invention relates generally to the field of computer graphics and, more particularly, to a high performance graphics system which implements super-sampling.

Δ

2. Description of the Related Art

A computer system typically relies upon its graphics system for producing visual output on the computer screen or display device. Early graphics systems were only responsible for taking what the processor produced as output and displaying that output on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display images that are more complex with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. However, with a powerful graphics system, the CPU may send a request to the graphics system stating: "draw a box at these coordinates". The graphics system then draws the box, freeing the processor to perform other tasks.

Since graphics systems typically perform only a limited set of functions, they may be customized and therefore far more efficient at graphics operations than the computer's general-purpose central processor. Graphics system processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Early graphics systems were limited to performing two-dimensional (2D) graphics. Their functionality has since increased to support three-dimensional (3D) wire-frame graphics, 3D solids, and now includes support for three-dimensional (3D) graphics with textures and special effects such as advanced shading, fogging, alpha-blending, and specular highlighting.

While the number of pixels is an important factor in determining graphics system performance, another factor of equal import is the quality of the image. Various methods are used to improve the quality of images, such as anti-aliasing, alpha blending, and fogging. While various techniques may be used to improve the appearance of computer graphics images, they also have certain limitations. In particular, they may introduce their own image aberrations or artifacts, and are typically limited by the density of pixels displayed on the display device.

As a result, a graphics system is desired which is capable of utilizing increased performance levels to increase not only the number of pixels rendered, but also the quality of the image rendered. In addition, a graphics system is desired which is capable of utilizing increases in processing power to improve graphics effects.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics systems render 2D and/or 3D images or objects into the frame buffer in pixel form, and then read the pixels from the frame buffer to refresh the display. To reduce visual artifacts that may be created by refreshing the screen at the same time as the frame buffer is being updated, most graphics systems' frame buffers are double-buffered.

To obtain images that are more realistic, some prior art graphics systems have implemented super-sampling by generating more than one sample per pixel. By calculating more samples than pixels (i.e., super-sampling), a more detailed image is calculated than can be displayed on the display device. For example, a graphics system may calculate 4, 8 or 16 samples for each pixel to be output to the display device. After the samples are calculated, they are then combined, convolved, or filtered to form the pixels that are stored in the frame buffer and then conveyed to the display device. Using pixels formed in this manner may create a more realistic final image because overly abrupt changes in the image may be smoothed by the filtering process.

As used herein, the term "sample" refers to calculated information that indicates the color of the sample and possibly other information, such as depth (z), transparency, etc., of a particular point on an object or image. For example, a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information").

When a graphics system implements super-sampling, the graphics system is typically required to select sample positions for the samples, generate samples at the selected sample positions, read a plurality of samples, i.e., sample data, corresponding to the area or support region of a filter, and then filter the samples within the filter region to generate an output pixel. To generate pixel values from sample data in real time as needed for a video data stream, improved methods are desired for managing the sample data used to generate pixel values for each pixel location.

SUMMARY

The problems set forth above may at least in part be solved by a data management system and method for real time calculation of pixel values from sample data. The elements of such a data management system may include a sample buffer that is configured to store sample data in rows of sample bins. Sample data for one or more sample positions may be stored in each sample bin and the rows of sample bins define a region in sample space. Sample data includes one or more of sample location, color values, transparency value, and depth. A bin scanline cache may be configured to store P rows of sample bins copied from P sequential rows of the sample buffer from a specified portion of sample space. N sequential rows of the P rows may be approximately vertically centered on a selected pixel location in sample space. N and P are positive integers, and P is greater than or equal to N. A sample cache may be configured to store an N×N sample bin array of sample bins copied from N sequential columns of the N sequential rows of the bin scanline cache. The sample bins contained in the N×N sample bin array may be approximately centered on the selected pixel location in sample space.

A sample processor may be configured to determine pixel values for the selected pixel location by processing one or more sample values stored in the sample cache. A sample controller may be configured to select a sequence of pixel locations in sample space that corresponds to a sequence of pixels in a video data stream. The sample controller may execute, for each pixel location in the sequence, a set of operations that includes one or more of: a) reading sample data from one or more sequentially selected rows of sample bins from the sample buffer and storing said sample data in one or more corresponding rows of sample bins in the bin scanline cache, b) reading sample data from one or more sequentially selected columns of N sample bins from the bin scanline cache and storing said sample data in one or more corresponding columns of N sample bins in the sample cache, so that for each pixel in the sequence, the N×N sample bin array is an array of sample bins that are approximately centered on the sample bin that contains the pixel location, c) initiating the determination of pixel values by the sample processor for the pixel location by processing the sample data stored in the sample bins of the N×N sample bin array, and d) outputting pixel data for inclusion in the video data stream. In some embodiments, the video data stream may be a real time video stream.

The system may also include a filter weights cache for storing filter coefficients that may be used to compute a weighted average of the sample data in the sample bins of the N×N sample bin array stored in the sample cache.

The system may also include a host computer configured to provide a stream of polygons representative of a collection of objects, a graphics processor (e.g. a rendering engine) for rendering the polygons into sample data and storing the sample data in the sample buffer, a video output unit configured to receive pixel values, convert the pixel values into a video signal, and output the video signal to a display.

In some embodiments, the method includes determining pixel values by calculating a weighted sum of the sample values for one or more sample locations from each of the sample bins in the N×N sample bin array using weight coefficients corresponding to a specified filter function with a specified filter extent. In these embodiments, the weight coefficients for each sample location may be determined by using a lookup table of values, stored in a filter weights cache corresponding to a specified filter function. The specified filter function may be programmable, and may be selected from a set of filter functions including, but not limited to, box filters, tent filters, square filters, and radial filters.

BRIEF DESCRIPTION OF THE DRAWINGS

A better understanding of the present invention can be obtained when the following detailed description is considered in conjunction with the following drawings, in which.

Figure 1:
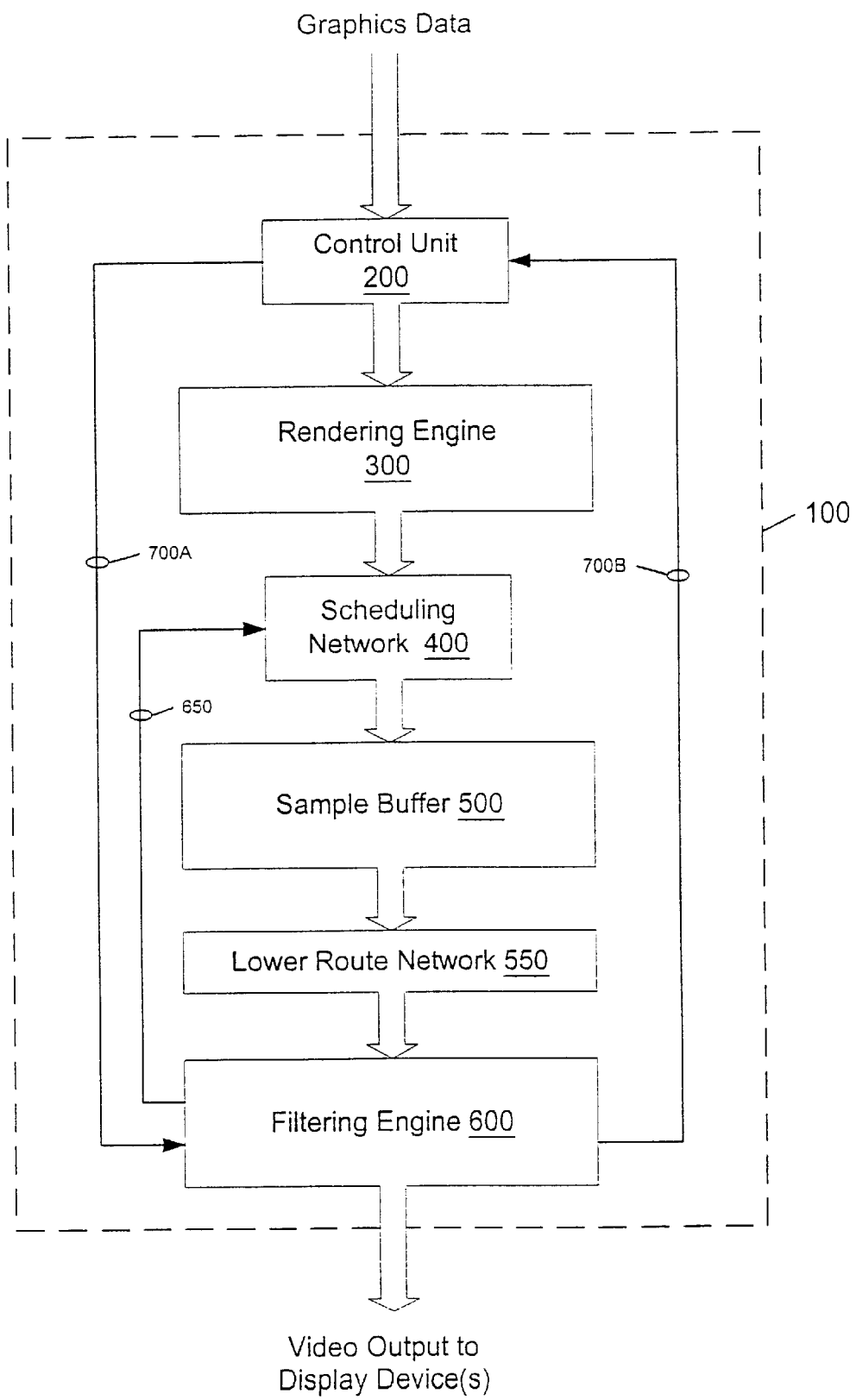
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
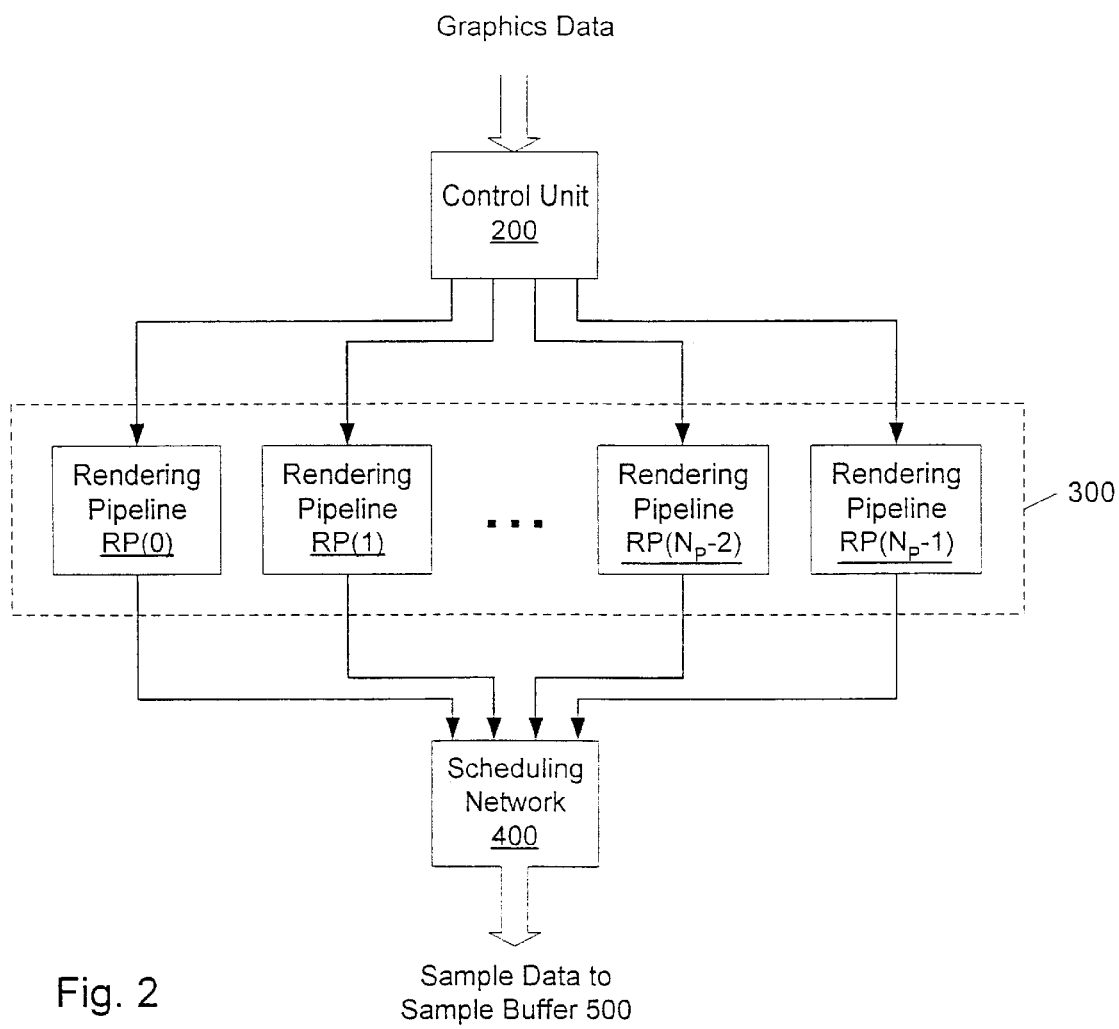
FIG. 2 illustrates one set of embodiments of a parallel rendering engine.

The rendering engine 300 may include a set of $N_{PL}$ rendering pipelines as suggested by FIG. 2, where NPL is a positive integer. The rendering pipelines, denoted as RP(0) through RP($N_{PL}$-1), are configured to operate in parallel. For example, in one embodiment, $N_{PL}$ equals four. In another embodiment, $N_{PL}=8$.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), . . . , VPS($N_D$-1), where $N_D$ is a positive integer. Thus, a set of host applications (running on a host computer) may send $N_D$ graphics data streams denoted GDS(0), GDS(1), . . . , GDS($N_D$-1) to the graphics system 100. The rendering engine 300 may perform rendering computations on each graphics data stream GDS(I), for I=0, 1, 2, . . . , $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
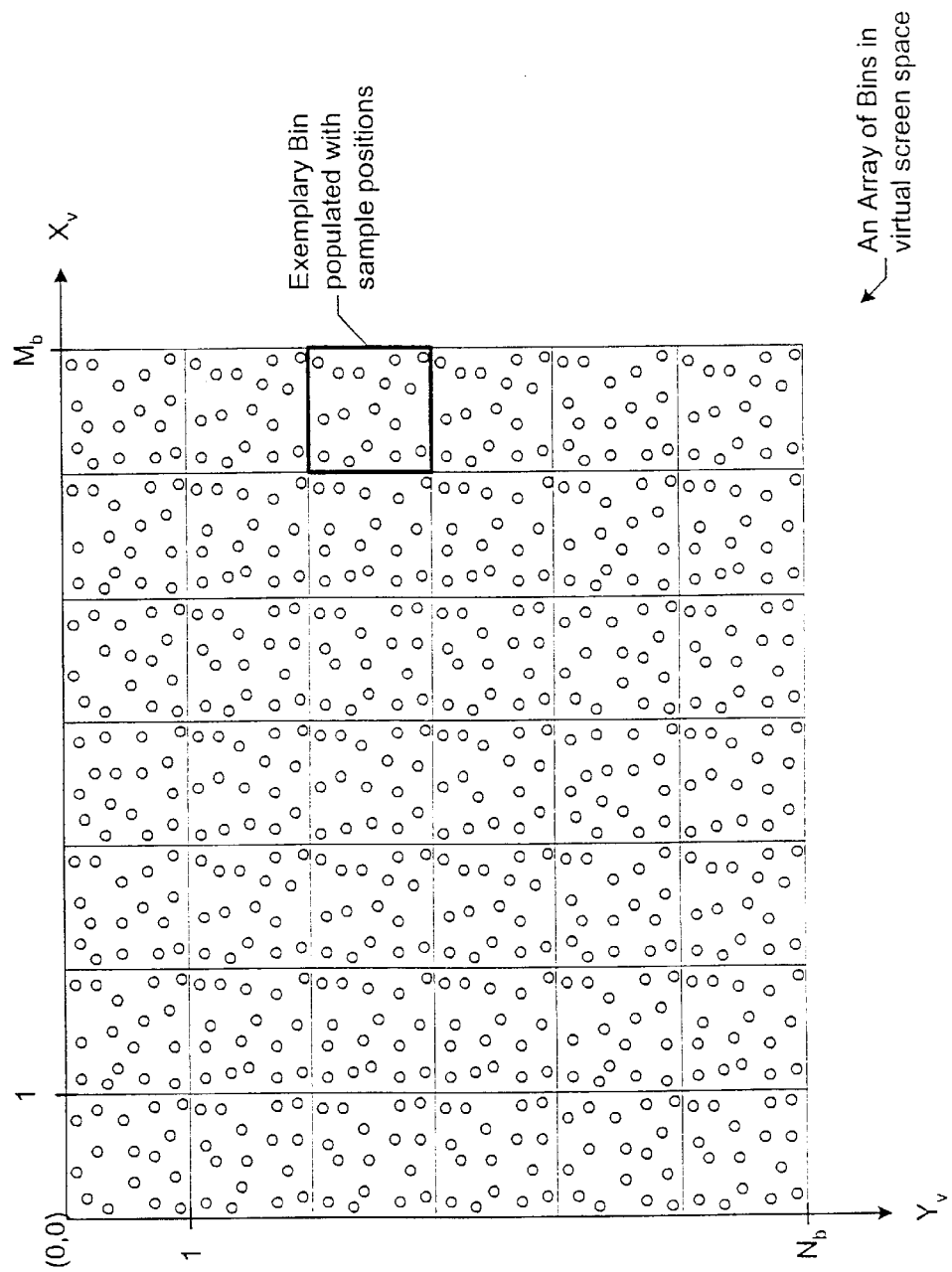
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;
(b) determine which of the $N_{s/b}$ sample positions reside interior to the primitive;
(c) compute a sample for each of the interior sample positions, and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
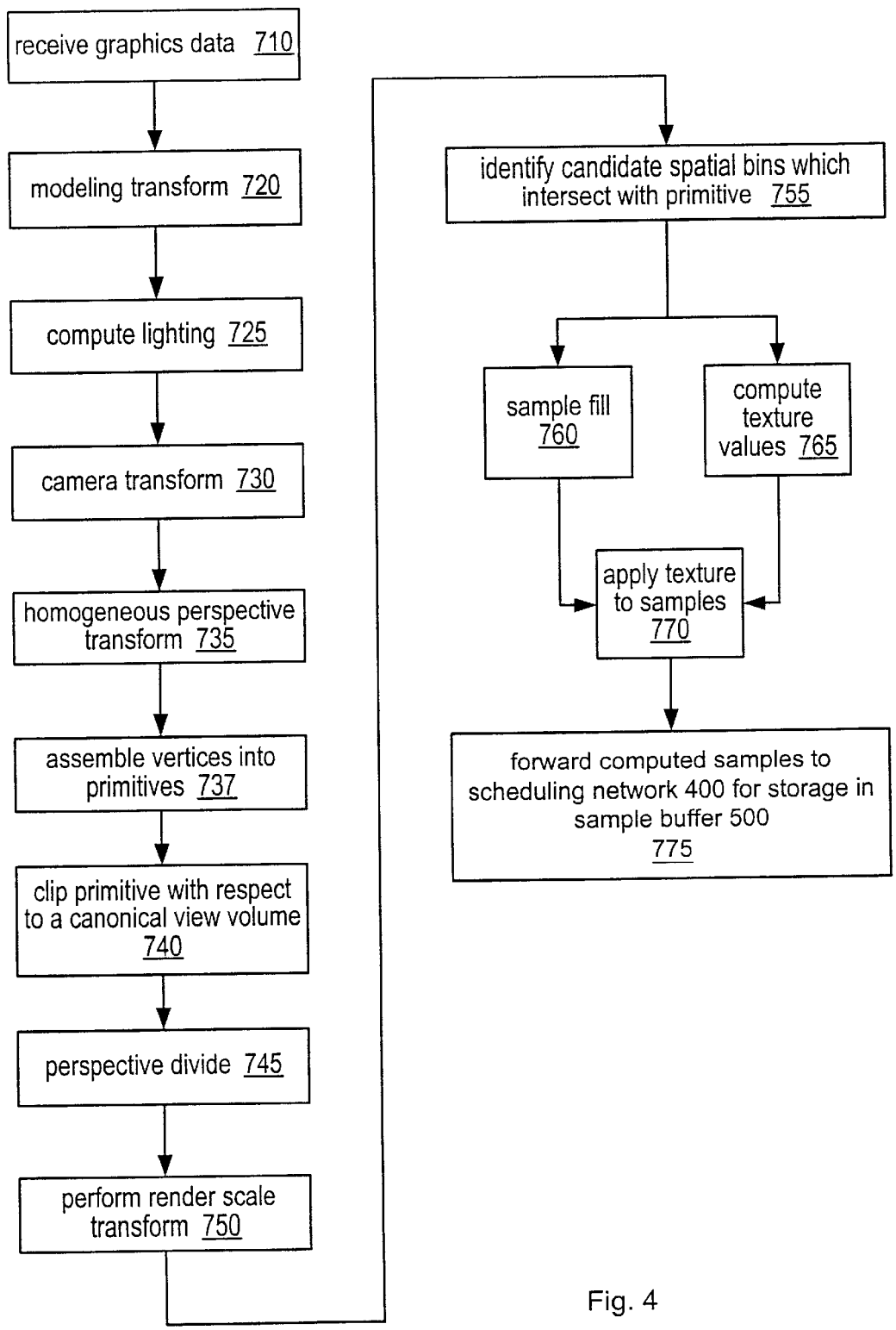
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$T1=(-W \leq X)$
$T2=(X \leq W)$
$T3=(-W \leq Y)$
$T4=(Y \leq W)$
$T5=(-W \leq Z)$
$T6=(Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations x=X/W
y=Y/W
z=Z/W.

After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
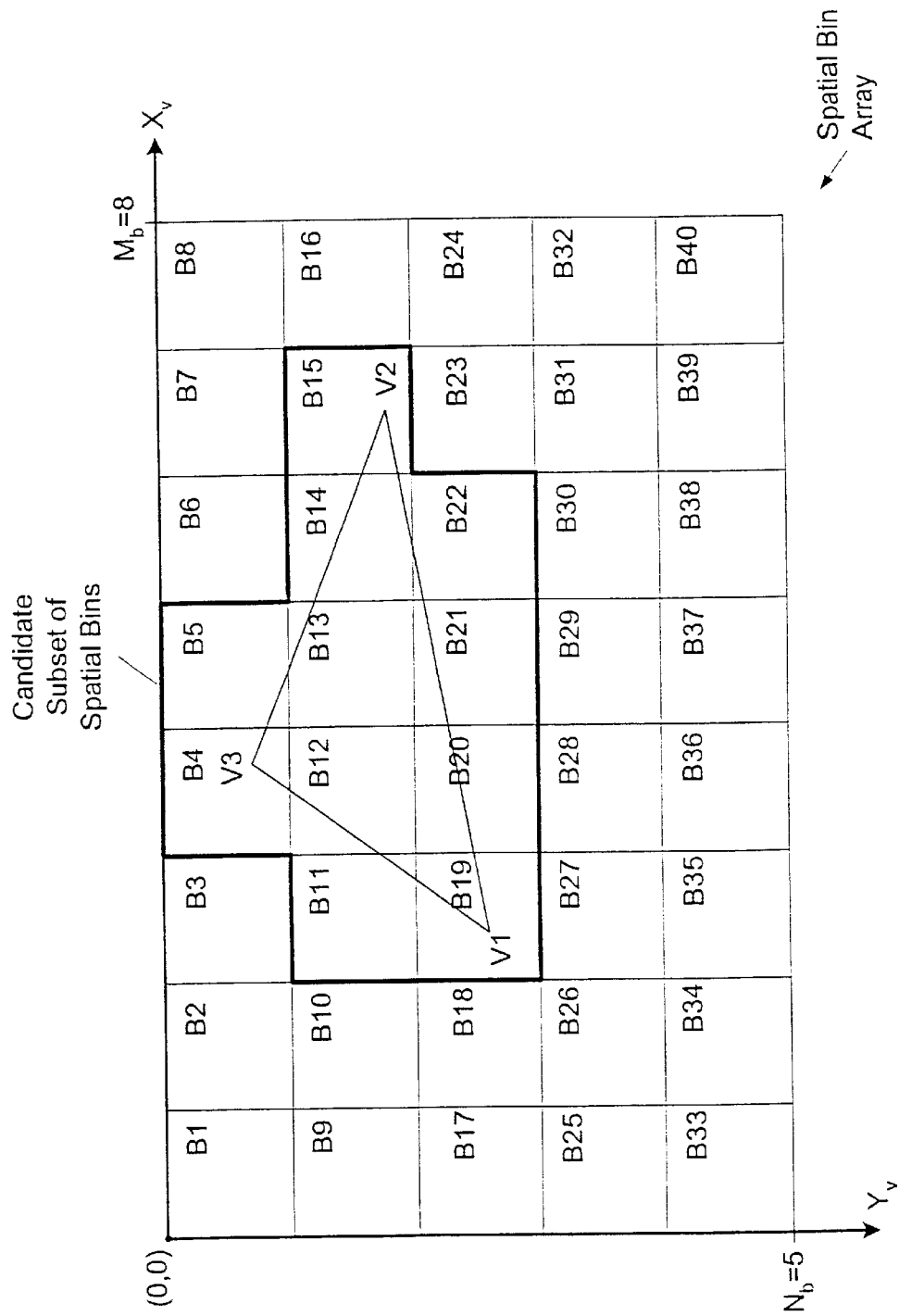
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
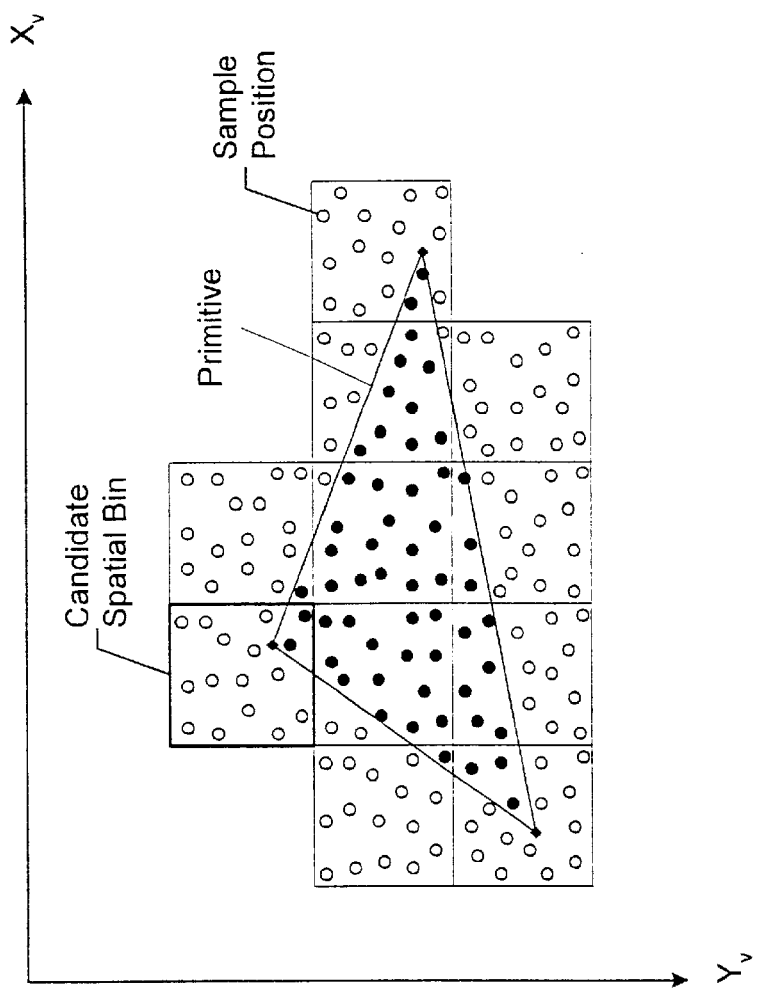
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
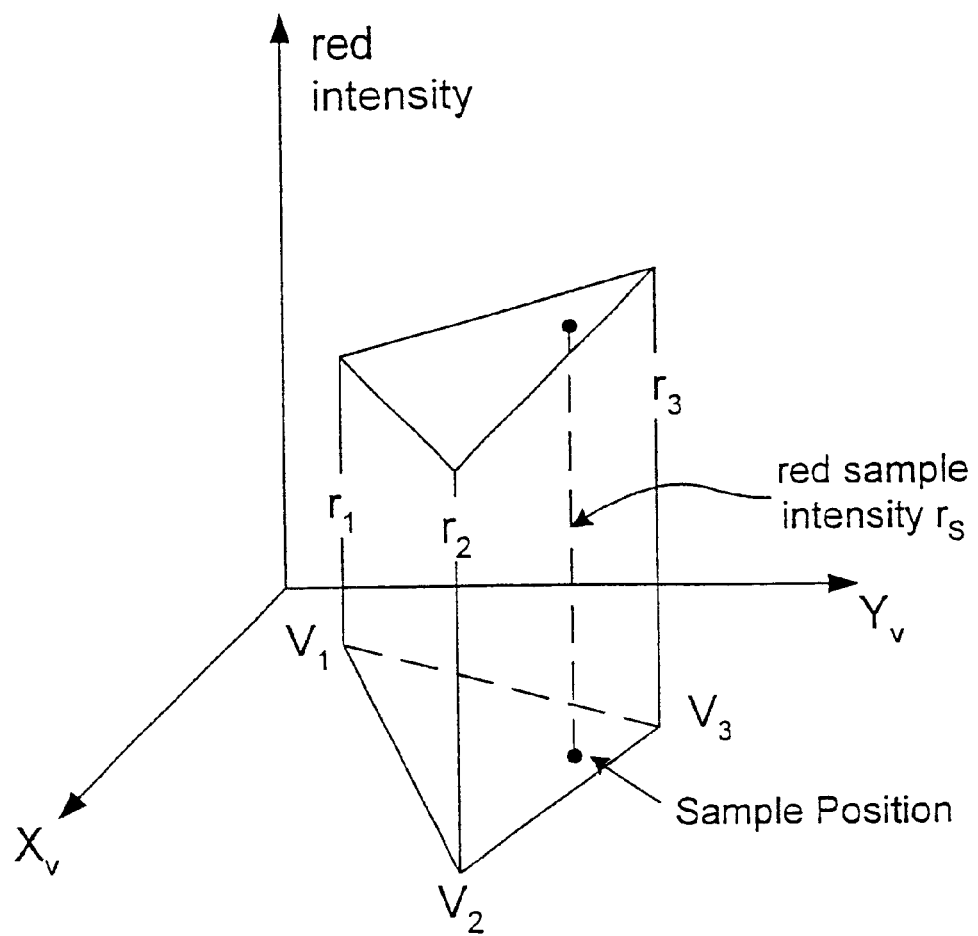
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
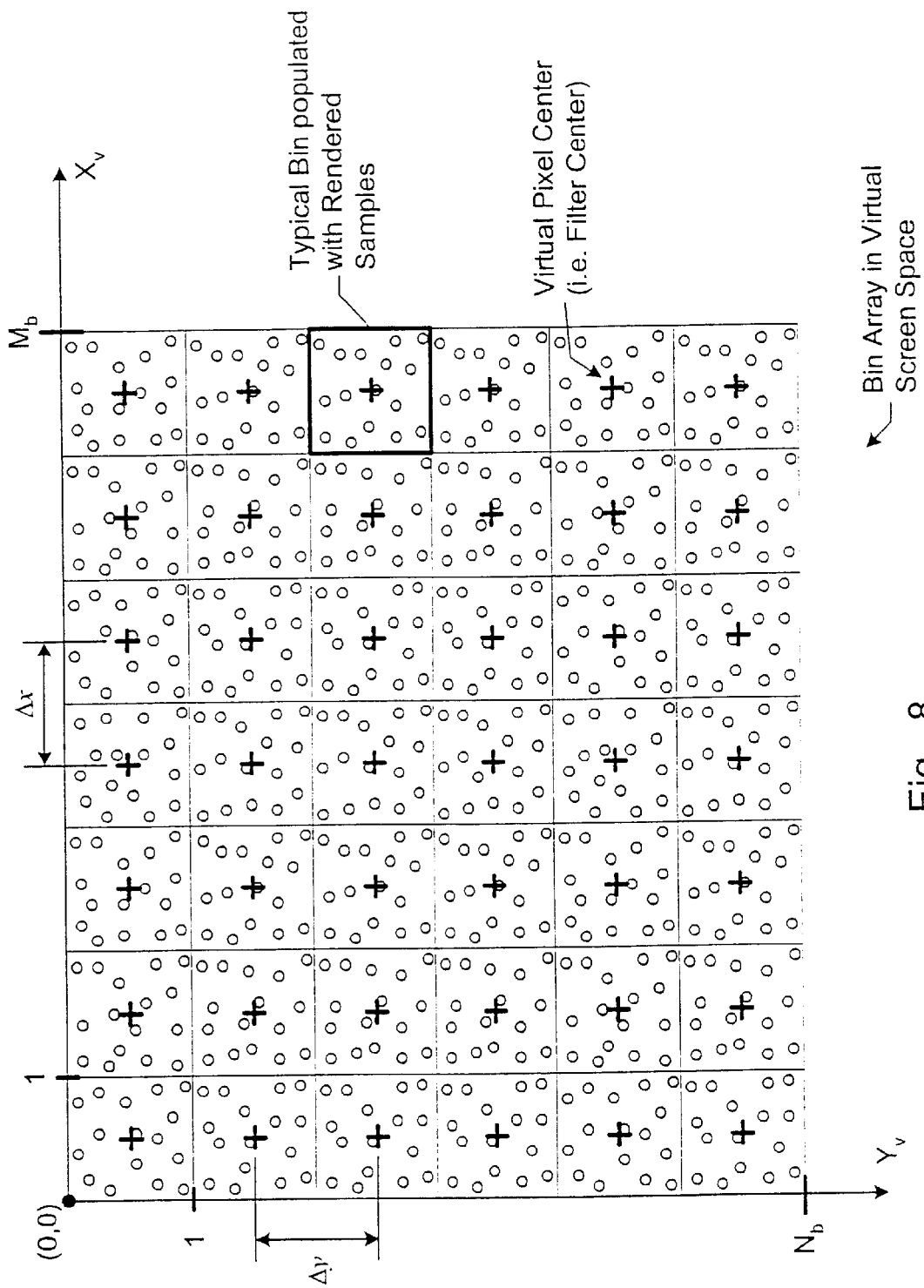
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
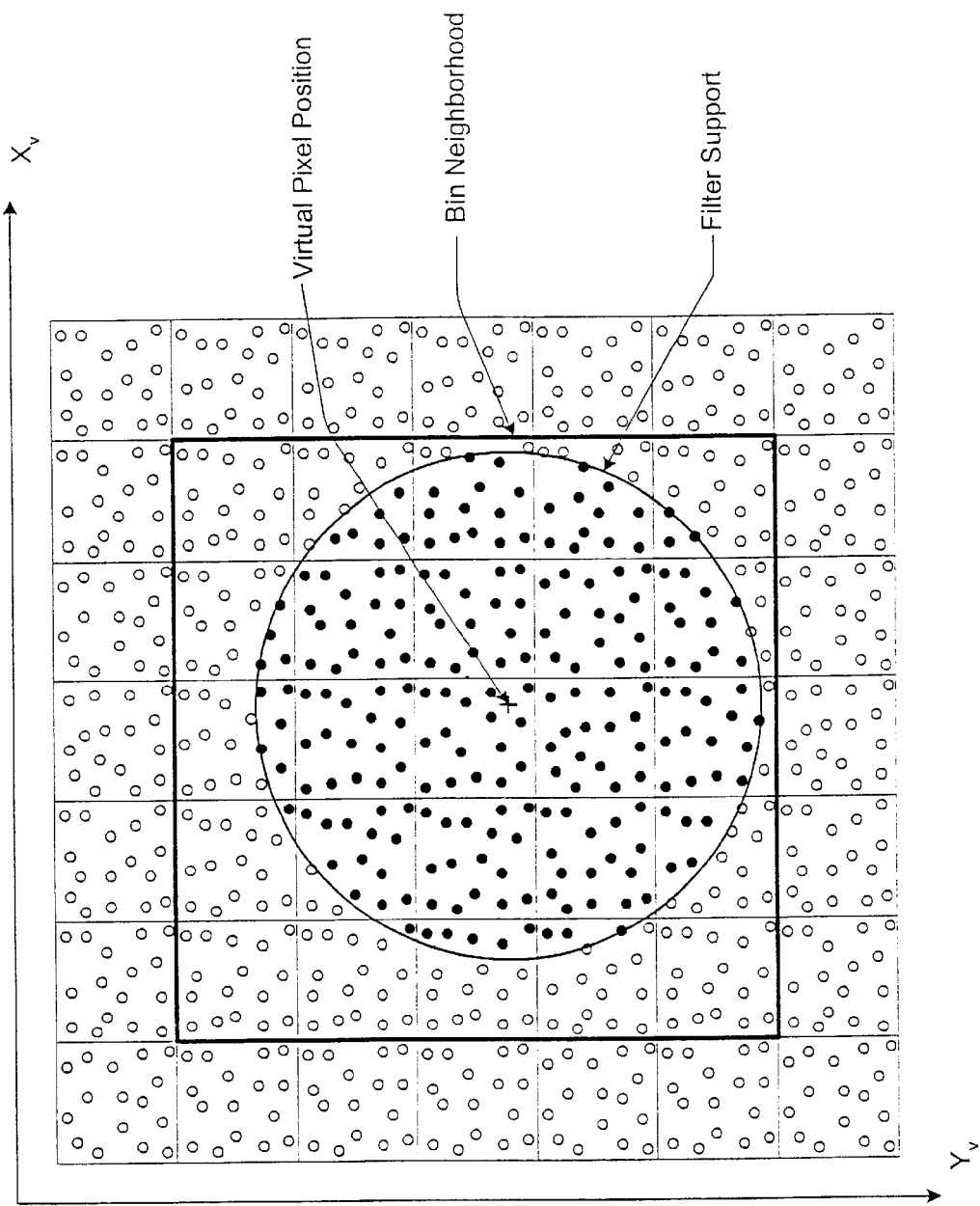
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \sum C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \sum C_S.$$

The initial pixel values may then be multiplied by the reciprocal of E (or equivalently, divided by E) to determine normalized pixel values:

$R_P = (1/E) * r_P$ $G_P = (1/E) * g_P$ $B_P = (1/E) * b_P$ $A_P = (1/E) * \alpha_P$.

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D_S)^2$ of each sample position $(X_S, Y_S)$ in the bin neighborhood with respect to the virtual pixel position $(X_P, Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_S = (D_S)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P + R_f$, $X_P - R_f$, $Y_P + R_f$, and $Y_P - R_f$. Each sample S in the bin neighborhood may be marked as being valid if the sample's position $(X_S, Y_S)$ falls within the support square, i.e., if $X_P - R_f < X_S < X_P + R_f$ and $Y_P - R_f < Y_S < Y_P + R_f$.

Otherwise the sample S may be marked as invalid. Each valid sample may be assigned the same filter weight value (e.g., $C_S=1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), ..., FU($N_f$–1) operating in parallel, where the number $N_f$ of filtering units is a positive integer. For example, in one embodiment, $N_f=4$. In another embodiment, $N_f=8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f=4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f=4$) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_P=X_start(K);
Y_P=Y_start(K);
while (J<N_P) {
    while (I < M_H(K) {
        PixelValues = Filtration(X_P,Y_P);
        Send PixelValues to Output Buffer;
        X_P = X_P+ΔX(K);
        I = I + 1;
    }
    X_P=X_start(K)
    Y_P=Y_P+ΔY(K);
    J=J+1;
}
```

The expression Filtration($X_P,Y_P$) represents the filtration of samples in the filter support region of the current virtual pixel position ($X_P,Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
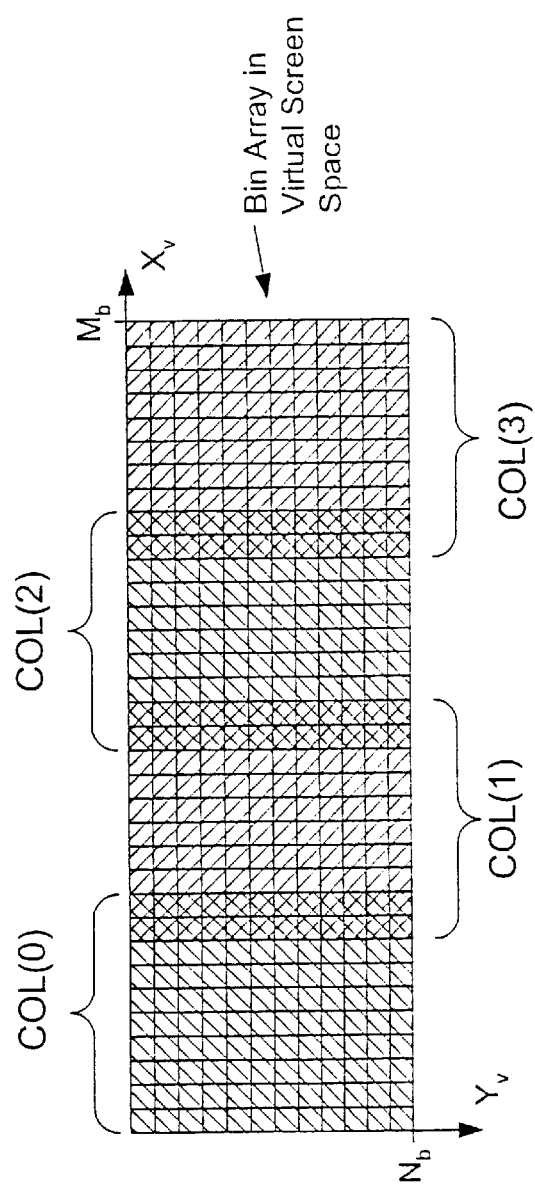
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
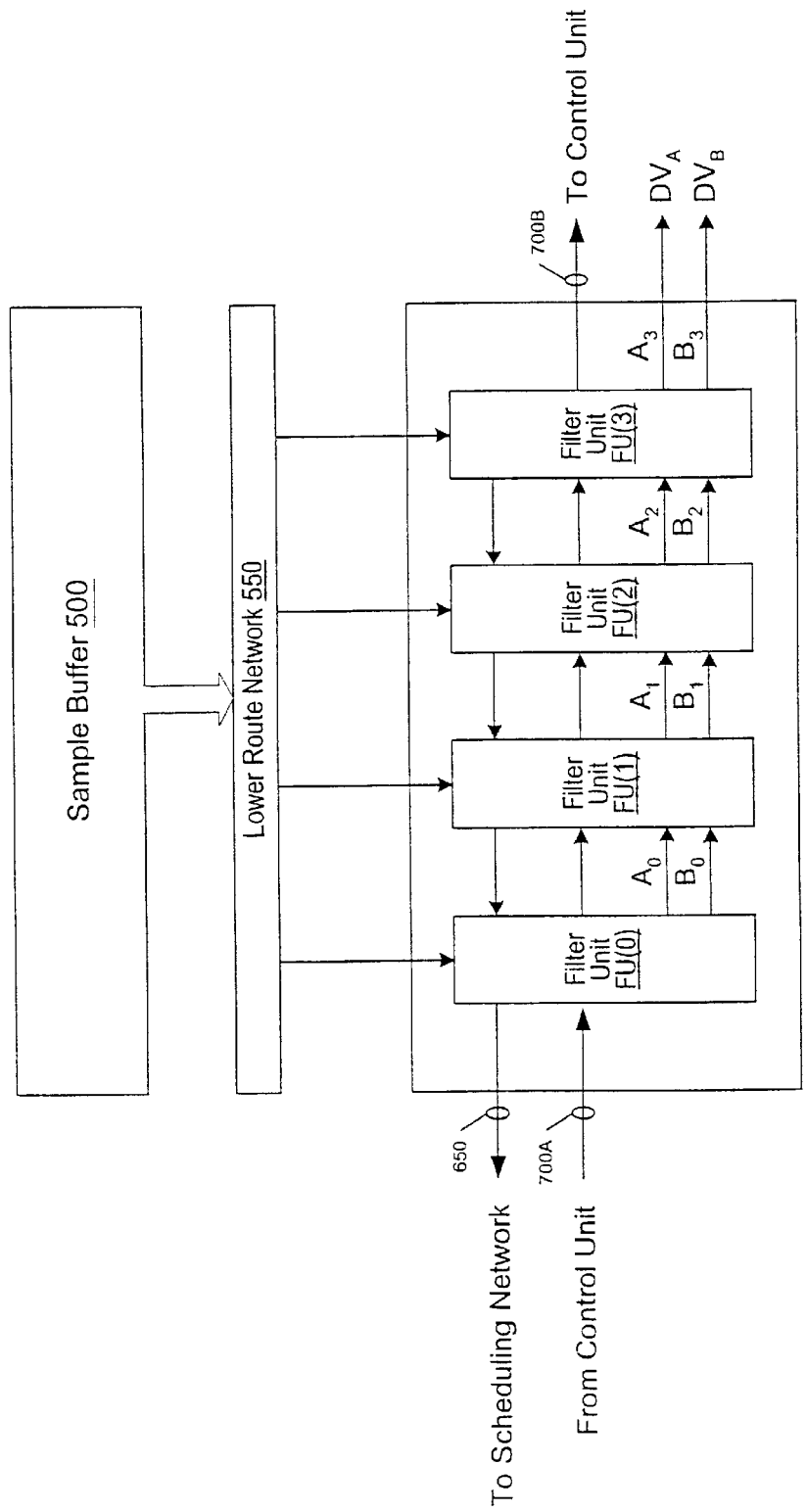
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f$–1), each filtering unit FU(K) may be configured to receive digital video input streams $A_{K-1}$ and $B_{K-1}$ from a previous filtering unit FU(K–1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$–1) receives digital video streams $A_{Nf-2}$ and $B_{Nf-2}$ from the previous filtering unit FU($N_f$–2), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{Nf-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$, and $B_{-1}$ containing dummy pixels (e.g., pixels having a background color), and mix (or substitute) its computed pixel values into either video stream $A_{-1}$, or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
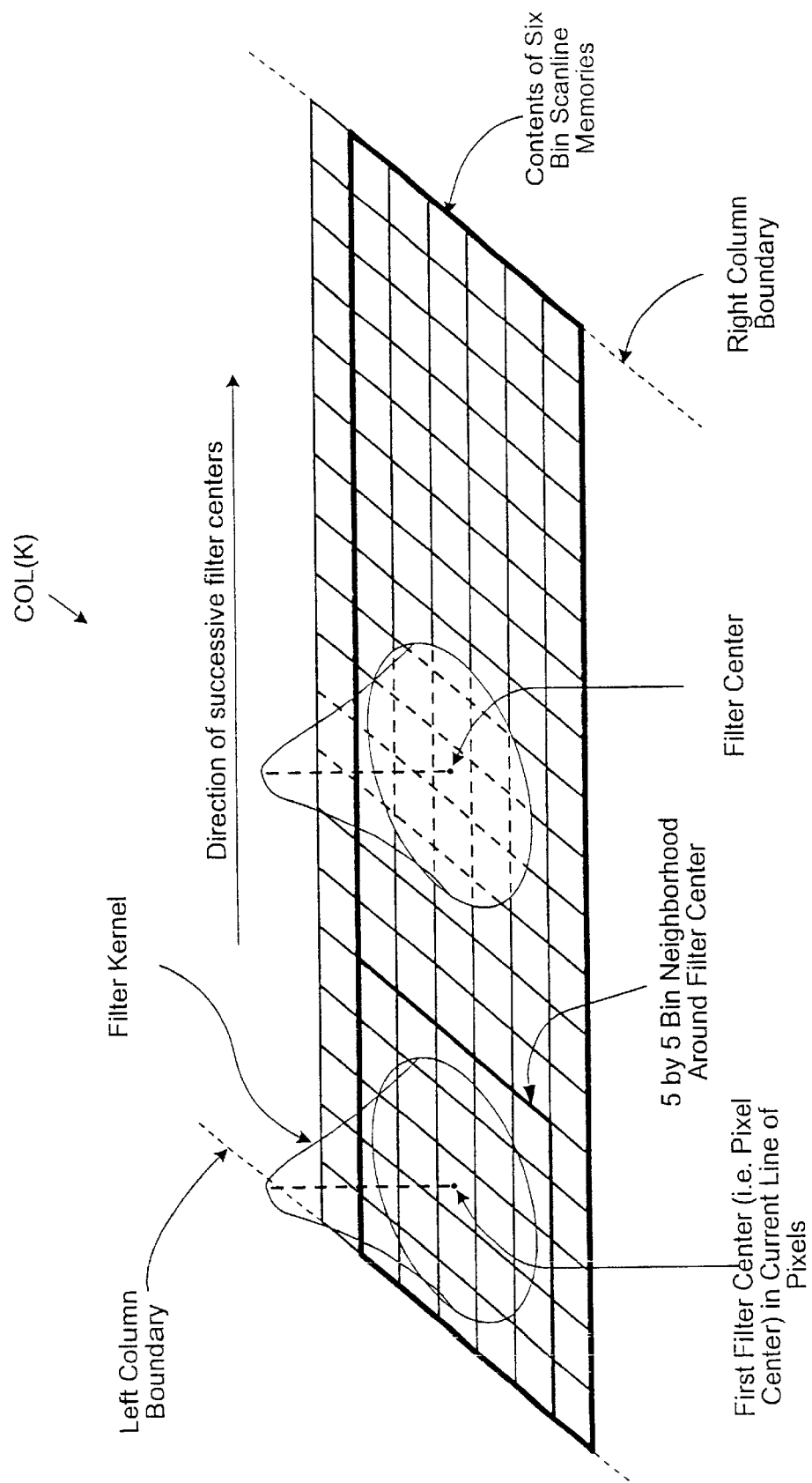
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), ..., MB($N_{MB}-1$), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer), 30 bits of sample color (for back buffer), 16 bits of alpha and/or overlay, 10 bits of window ID, 26 bits of z depth, and 4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
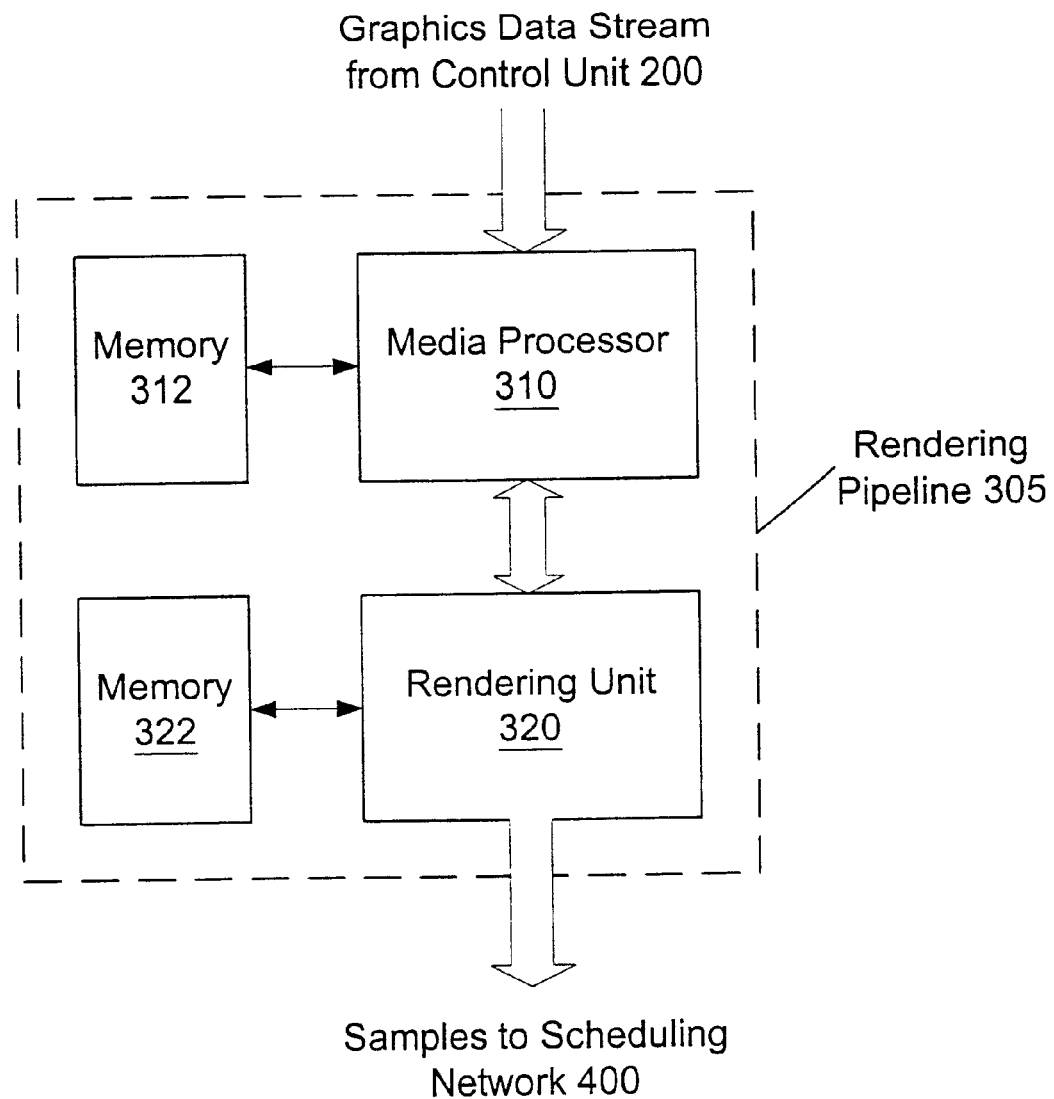
FIG. 13 illustrates one set of embodiments of a rendering pipeline comprising a media processor and a rendering unit.

As described above, the rendering engine 300 may include a set of rendering pipelines RP(0), RP(1), ..., RP($N_{PL}$-1). FIG. 13 illustrates one embodiment of a rendering pipeline 305 that may be used to implement each of the rendering pipelines RP(0), RP(1), ..., RP($N_{PL}$-1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
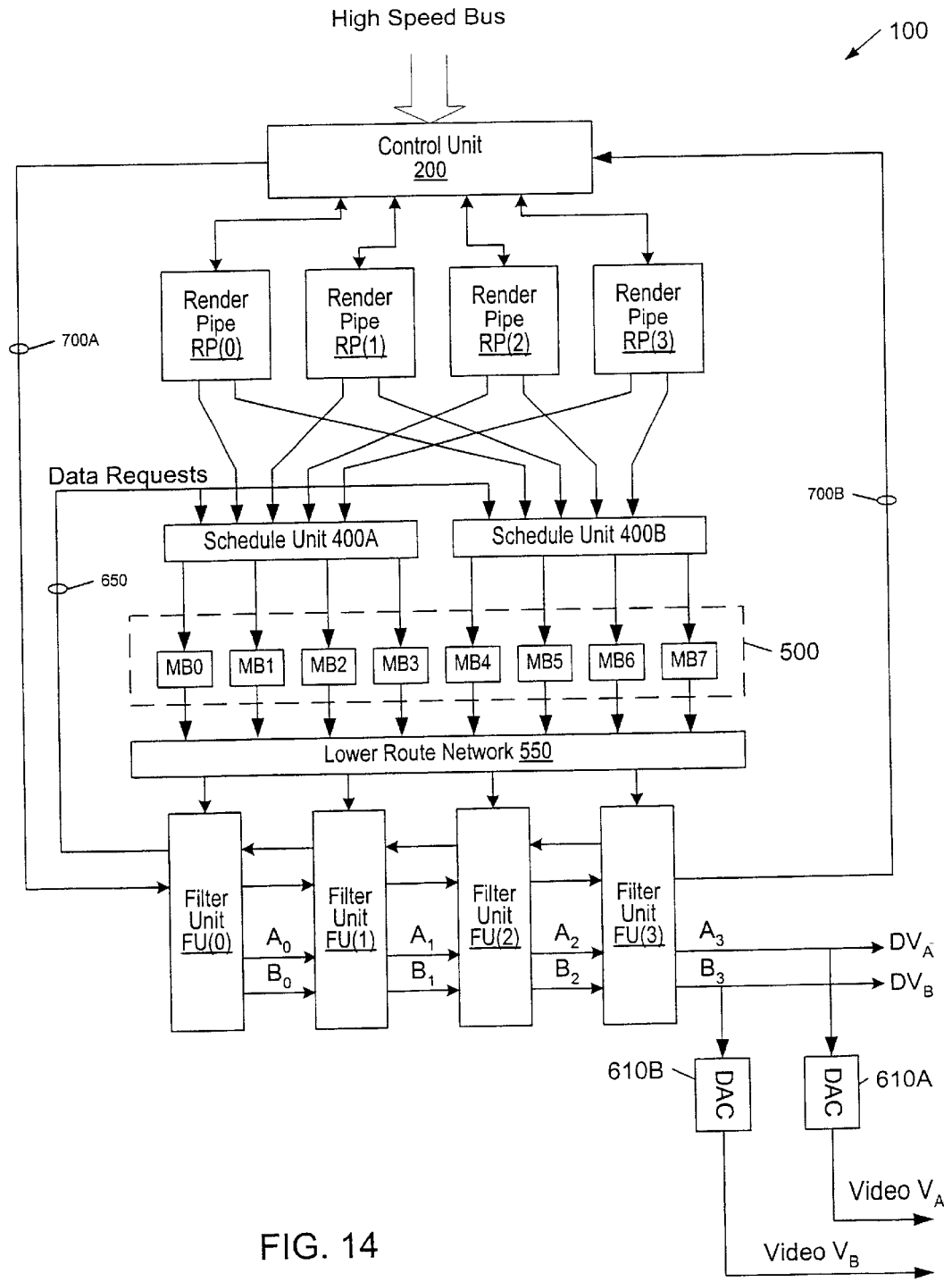
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
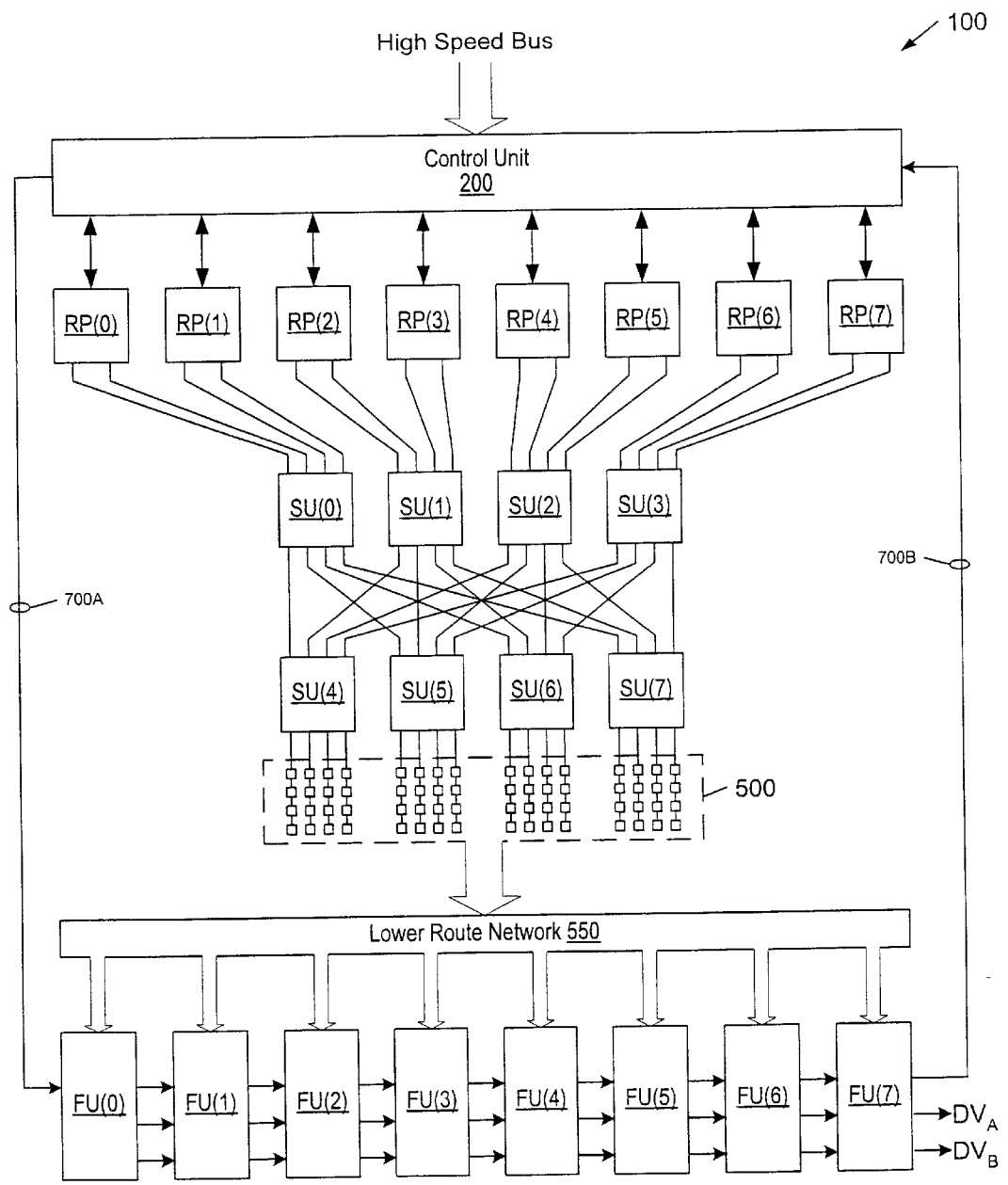
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Data Management System to Enable Video Rate Anti-aliasing Convolution

Figure 16:
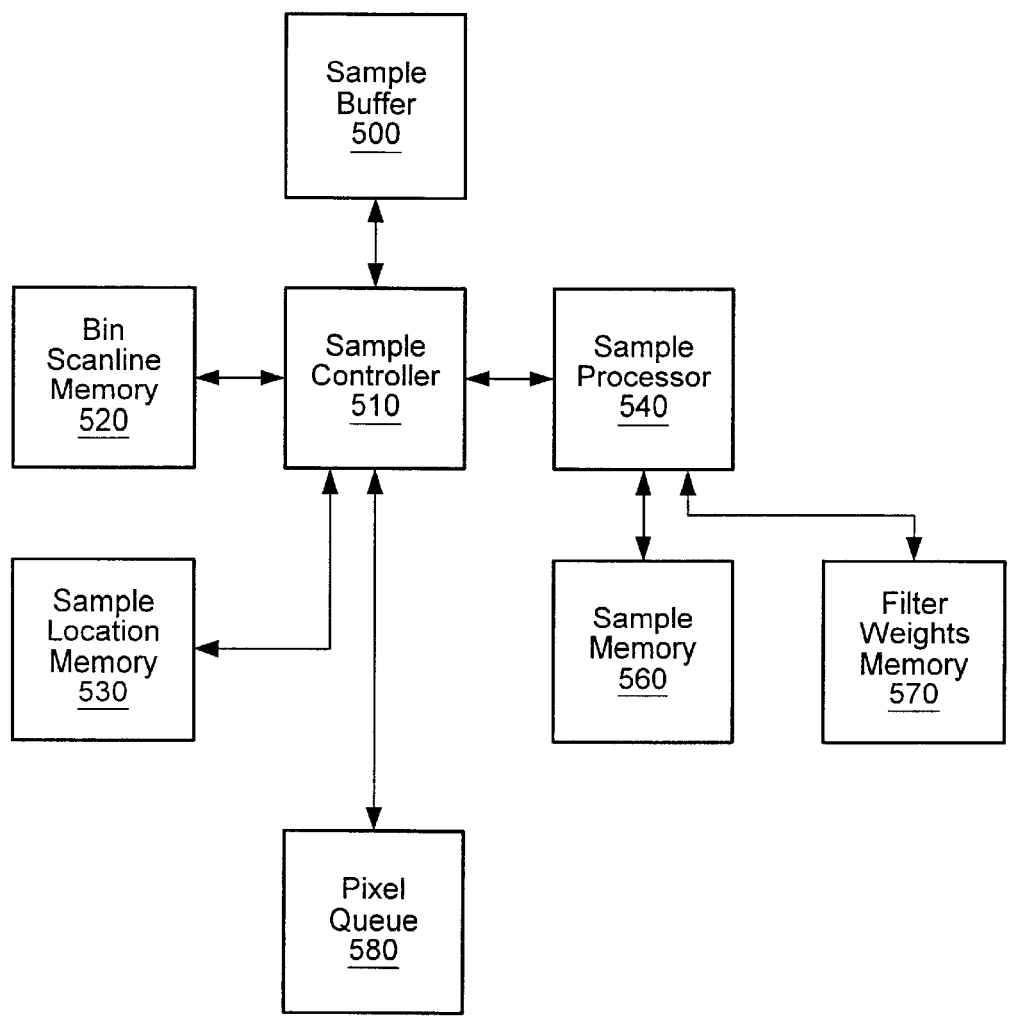
FIG. 16 illustrates one embodiment of a system to enable video rate anti-aliasing convolution.
Figure 21A:
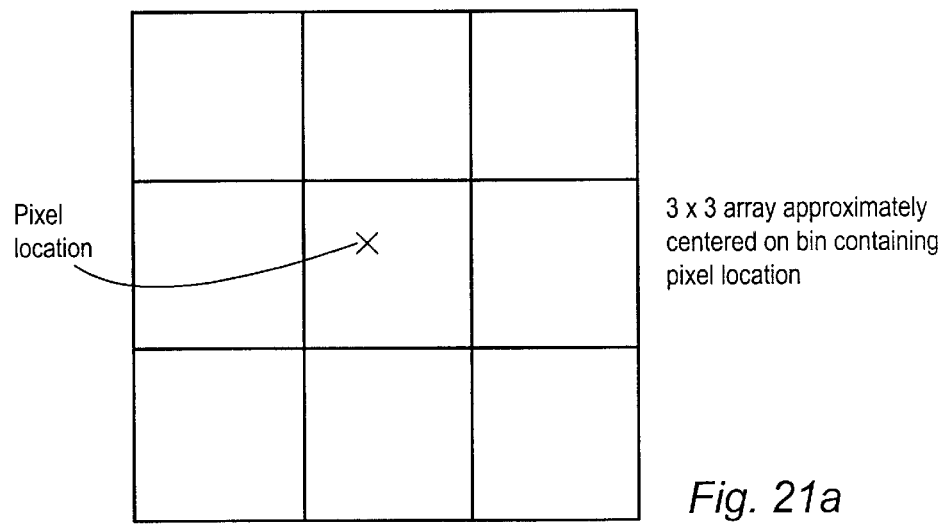
FIG. 21*a* illustrates a 3×3 array of sample bins approximately centered on a pixel location.
Figure 21B:
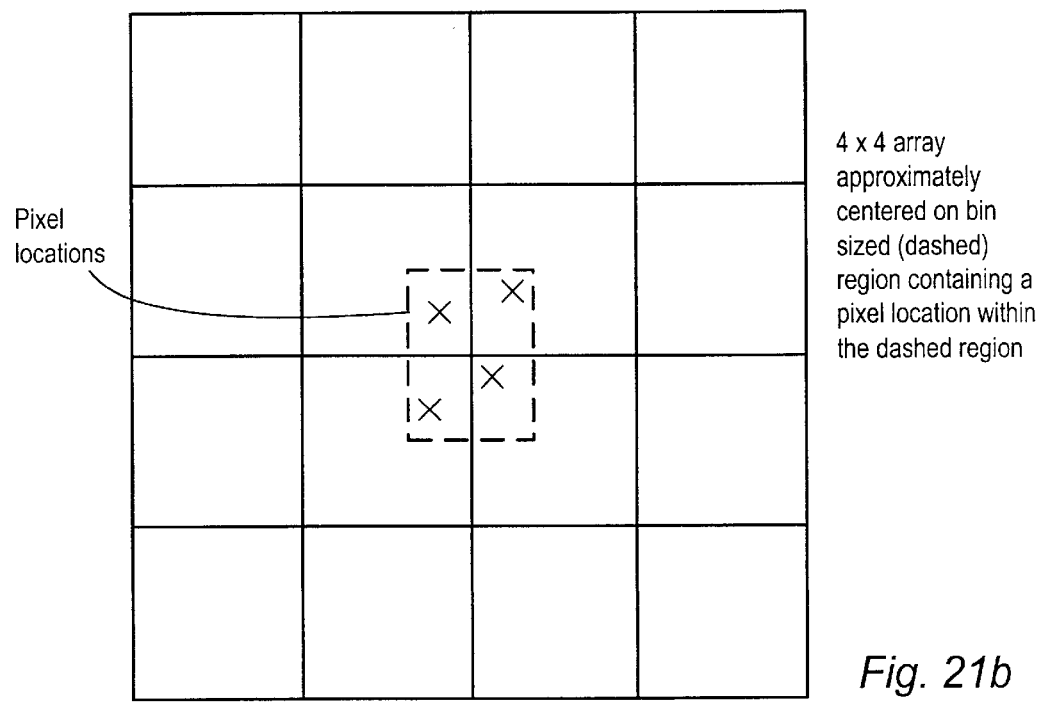
FIG. 21*b* illustrates a 4×4 array of sample bins approximately centered on a pixel location.

FIG. 16 illustrates a set of embodiments of a data management system including a first memory 500 (also referred to as a sample buffer) that is configured to store sample data in rows of sample bins. Sample data for one or more sample positions may be stored in each sample bin and the rows of sample bins define a region in sample space. A second memory 520 (also referred to as a bin scanline memory or a bin scanline cache) may be configured to store P rows of sample bins copied from P sequential rows of the first memory 500 from a specified portion of sample space. N sequential rows of the P rows are approximately vertically centered on a selected pixel location in sample space. N and P are positive integers, and P is greater than or equal to N. A third memory 560 (also referred to as a sample memory or a sample cache) may be configured to store sample bins copied from N sequential columns of the N sequential rows of the second memory 520. The sample bins contained in the N×N sample bin array are approximately centered on the selected pixel location in sample space. FIG. 21a illustrates the concept of "approximately centered" for a 3×3 sample bin array. If a pixel location resides in the central sample bin in the array, then the 3×3 sample bin array may be considered approximately centered on the pixel location. FIG. 21b illustrates the concept of "approximately centered" for a 4×4 sample bin array. If the pixel location resides in the bin sized (dashed) region in the center of the array, then a 4×4 sample bin array may be considered approximately centered on the pixel location.

A sample processor 540 may be configured to determine pixel values for the selected pixel location by processing one or more sample values stored in the third memory 560. A sample controller 510 may be configured to select a sequence of pixel locations in sample space that corresponds to a sequence of pixels in a video data stream. The sample controller 510 may execute, for each pixel location in the sequence, a set of operations that includes one or more of: a) reading sample data from one or more sequentially selected rows of sample bins from the first memory 500 and storing said sample data in one or more corresponding rows of sample bins in the second memory 520, b) reading sample data from one or more sequentially selected columns of N sample bins from the second memory 520 and storing said sample data in one or more corresponding columns of N sample bins in the third memory 560, so that for each pixel in the sequence, the N×N sample bin array is an array of sample bins that are approximately centered on the sample bin that contains the pixel location, c) initiating the determination of pixel values for the pixel location by processing the sample data stored in the sample bins of the N×N sample bin array, and d) outputting pixel data for inclusion in the video data stream. In some embodiments, the video data stream is a real time video stream.

In some embodiments, the second memory 520, the third memory 560, the sample processor 540, and the sample controller 510 are placed in close proximity on a single integrated circuit chip.

The third memory 560 may include two or more sub-memories and the sample processor may include two or more sub-processors, wherein each sub-processor may be dedicated to process sample values stored in one of the sub-memories. In one particular set of embodiments, the third memory 560 may be subdivided into $N^2$ sub-memories and the sample processor 540 may be subdivided into $N^2$ sub-processors. Each sub-memory may store the sample values for one of the sample bins of the N×N sample bin array, and each sub-processor may be dedicated to process the sample values in a specific sample bin.

Figure 20:
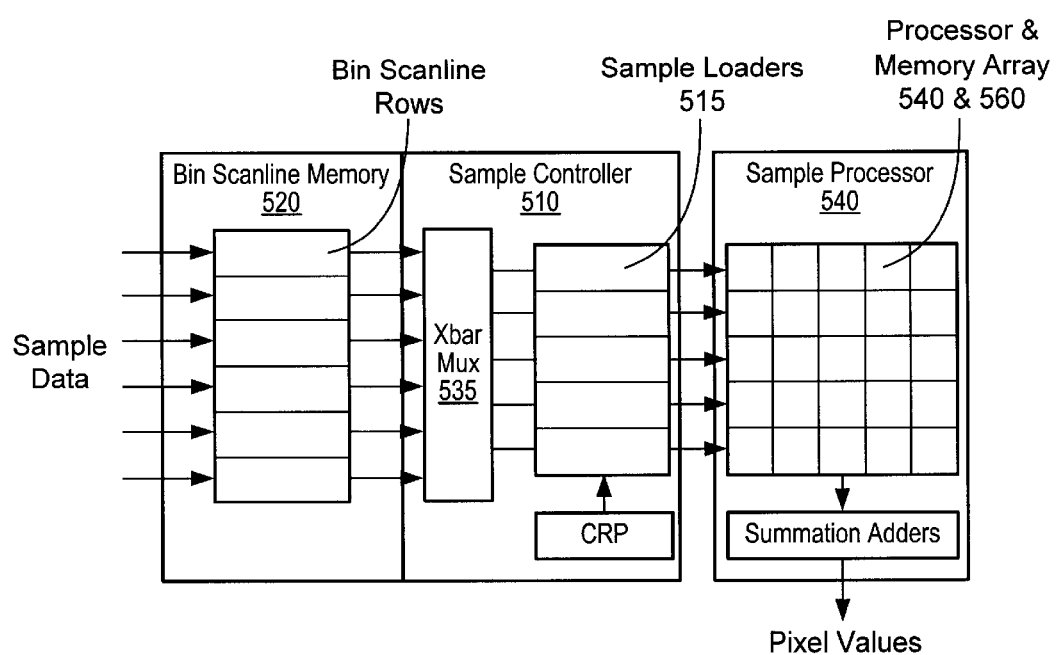
FIG. 20 illustrates additional details of one embodiment of a system to enable video rate anti-aliasing convolution.

In some embodiments, the sample controller 510 includes N sample loaders 515. FIG. 20 illustrates, for N=5, that each sample loader may be dedicated to one of the N rows of the sample memory 560 and receive sample data from any of the P rows of the bin scanline memory 520 through the Xbar Mux 535.

The system may also include a pixel queue 580 configured to store pixel values in a first-in first-out (FIFO) order and to send a stall signal to the sample controller 510 if the pixel queue 580 reaches a specified maximum number of stored pixel values. The sample controller 510 may be configured to a) receive the stall signal, b) interrupt the sample processor 540 after all pixel locations in process are completed, and c) restart the sample processor 540 when the number of pixels in the pixel queue 580 has sufficiently decreased to reach a specified restart number of stored pixel values.

The system may also include a filter weights memory 570 for storing filter coefficients that may be used to compute a weighted average of the sample data in the sample bins of the N×N sample bin array stored in the sample memory 560.

In some embodiments, the system may also include a host computer configured to provide a stream of polygons representative of a collection of objects, a graphics processor (e.g. rendering engine 300) for rendering the polygons into sample data and storing the sample data in the first memory 500, and a display unit for displaying the processed pixel data.

In some embodiments, there may be a sample location memory 530A in a graphics accelerator for storing a small array of sample locations. The graphics accelerator renders sample values for a larger array of sample locations by tiling the small array across sample space and stores the sample values without sample locations in the first memory 500. The data management system may regenerate sample locations for each sample read from the second memory 520 by reading corresponding sample locations from sample location memory 530B for each sample value, and the sample values and corresponding locations may be stored in the third memory 560.

In some embodiments, the system includes a sample buffer 500, configured to store sample values for one or more sample locations in each sample bin of an array of sample bins; a bin scanline memory 520, configured to store sample values from the sample buffer for N+1 sequential rows of sample bins from a specified portion of the sample buffer, where N is a positive integer; a filter weights cache 570 for storing filter coefficients used to calculate a weighted average of sample values; a sample location cache 530 for storing an array of sample locations (a specific location corresponding to each sample value may be generated from the array of sample locations); a sample cache 560 configured to store sample values and corresponding sample locations in a sample bin array comprising N columns and N rows of sample bins forming an N×N sample bin array that is approximately centered on one of the sample bins that contains a selected pixel location; a sample processor 540 configured to determine pixel values for the selected pixel location by calculating a weighted average of sample values for one or more sample locations in each sample bin in the N×N sample bin array; and a sample controller 510 configured to a) transfer sample data between the sample buffer 500 and the bin scanline memory 520, and between the bin scanline memory 520 and the sample cache 560, so that sample values and corresponding sample locations are stored in sample bins within the sample cache 560 such that the sample bins combine to form the N×N sample bin array that is approximately centered on a sample bin that contains the selected pixel location, b) initiate the determination of pixel values by the sample processor 540, c) output the pixel values to the pixel queue 580, d) identify the next pixel location in a video data stream, and e) repeat a) through d) for the next pixel location. In some embodiments of the system N=5.

The system may also include a video output unit and a display, wherein the video output unit is configured to receive the pixel values, convert the pixel values to a video signal, and output the video signal to the display.

Figure 17:
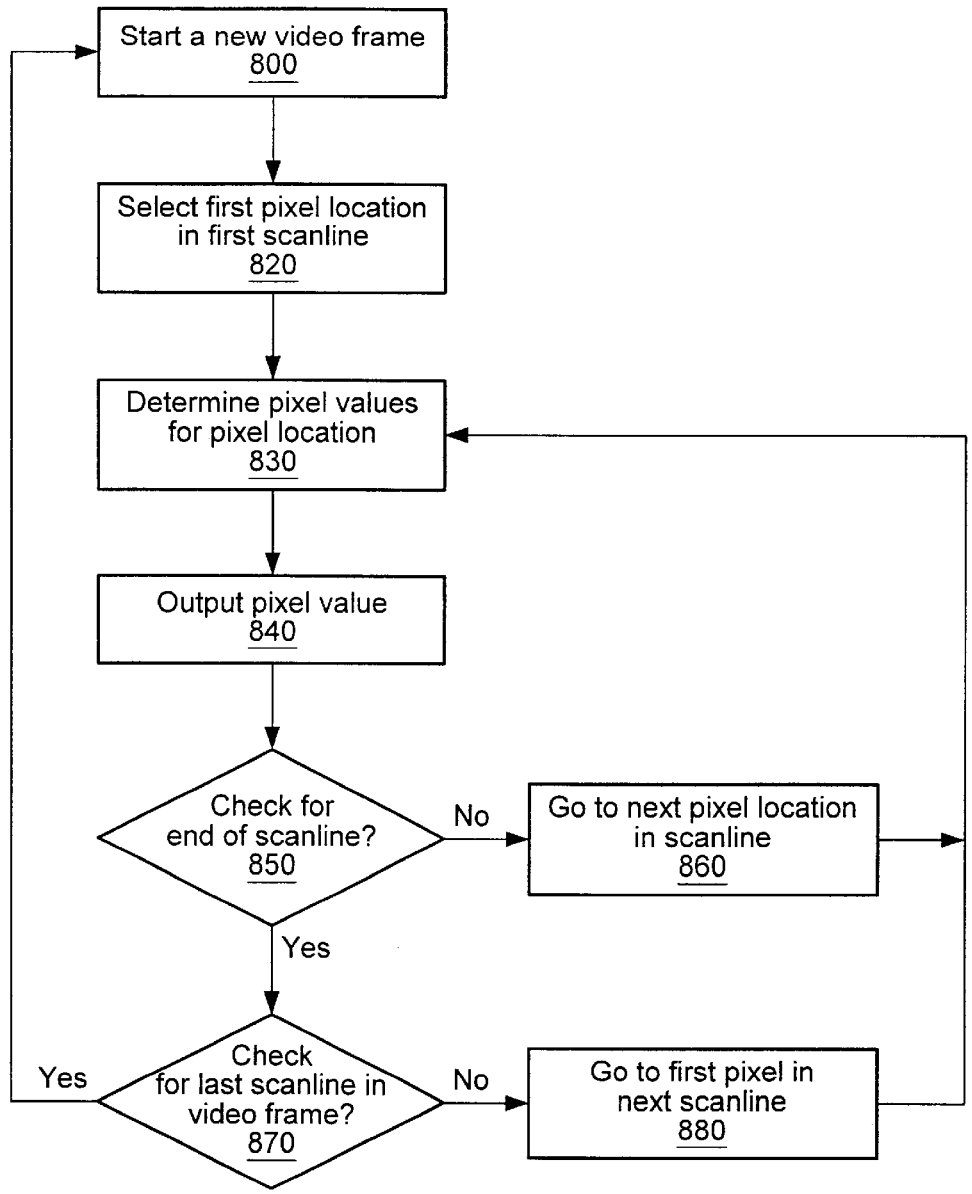
FIG. 17 illustrates one embodiment of a method to enable video rate anti-aliasing convolution.
Figure 18:
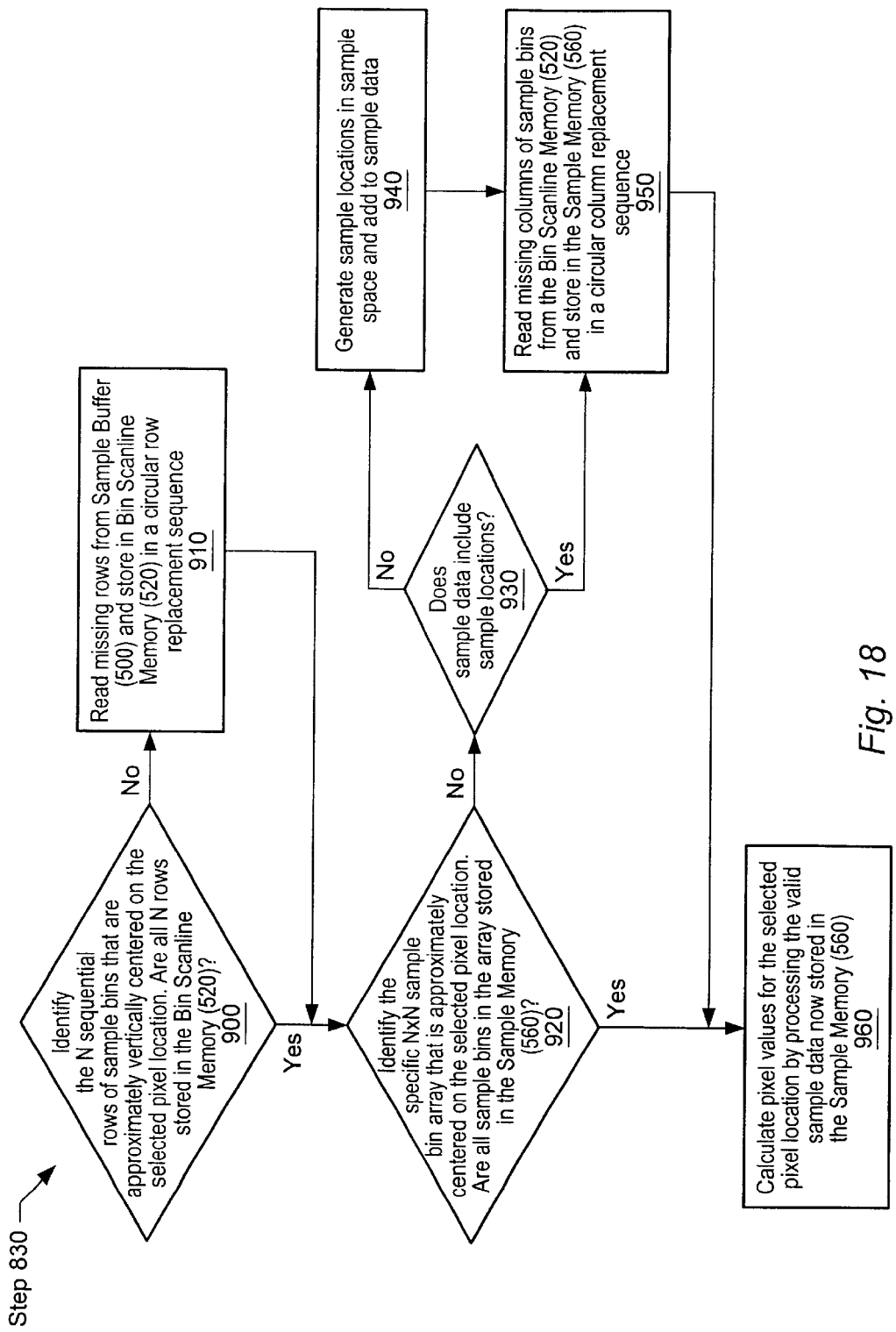
FIG. 18 illustrates additional details of one embodiment of a method to enable video rate anti-aliasing convolution.

FIGS. 17 and 18 illustrate a method to enable video rate anti-aliasing convolution for generating pixel data for a video data stream. The method for a new video frame (step 800) includes determining a location in sample space for a next pixel in a video data stream (step 820), determining pixel values for the selected pixel location (step 830), and outputting the pixel values (step 840). Step 830 is further detailed in FIG. 18. The method then checks for the end of a scanline (step 850). If not, the sample controller 510 selects the next pixel in the scanline and repeats steps 830 and 840. If a scanline end is detected, the sample controller 510 checks to see if the completed scanline is the last scanline in a video frame (step 870). If not, the sample controller 510 selects the first pixel in the next scanline and repeats steps 830 and 840. If the video frame is completed, then the sample controller 510 starts processing a new video frame (step 800).

A flowchart for the method for determining pixel values (step 830) is illustrated in FIG. 18 and includes: identifying N sequential rows of sample bins in sample space that are approximately vertically centered on the pixel location (step 900) (N being a positive integer); copying sample bins from a specified portion of one or more of the N sequential rows of sample bins from a first memory 500 to a second memory 520 so that the second memory 520 contains copies of the specified portion of each of the N sequential rows of sample bins (step 910); identifying a specific N×N sample bin array that is approximately centered on the pixel location (step 920); copying sample bins from one or more columns of the N sequential rows from the second memory 520 to a third memory 560 to form a sample bin array that contains copies of each of the sample bins that combine to form the specific N×N sample bin array (step 950); for some embodiments, the sample data does not include sample locations (step 930) and the method then also includes generating sample locations for each of the samples in each of the N×N sample bins (step 940) and storing both sample locations and sample values in the third memory 560 (step 950); and determining pixel values for the pixel location by processing sample data for one or more of the sample locations stored in each of the sample bins of the N×N sample bin array (step 960).

The method may also include storing the pixel values in a pixel queue 580 and outputting pixel values from the pixel queue to a real time video stream.

The first memory 500 may be a multi-sample buffer comprising sample bins with one or more samples per bin. Sample data includes one or more of sample location, color values, transparency value, and depth. The sample locations and the sample bins reside in sample space.

Figure 19:
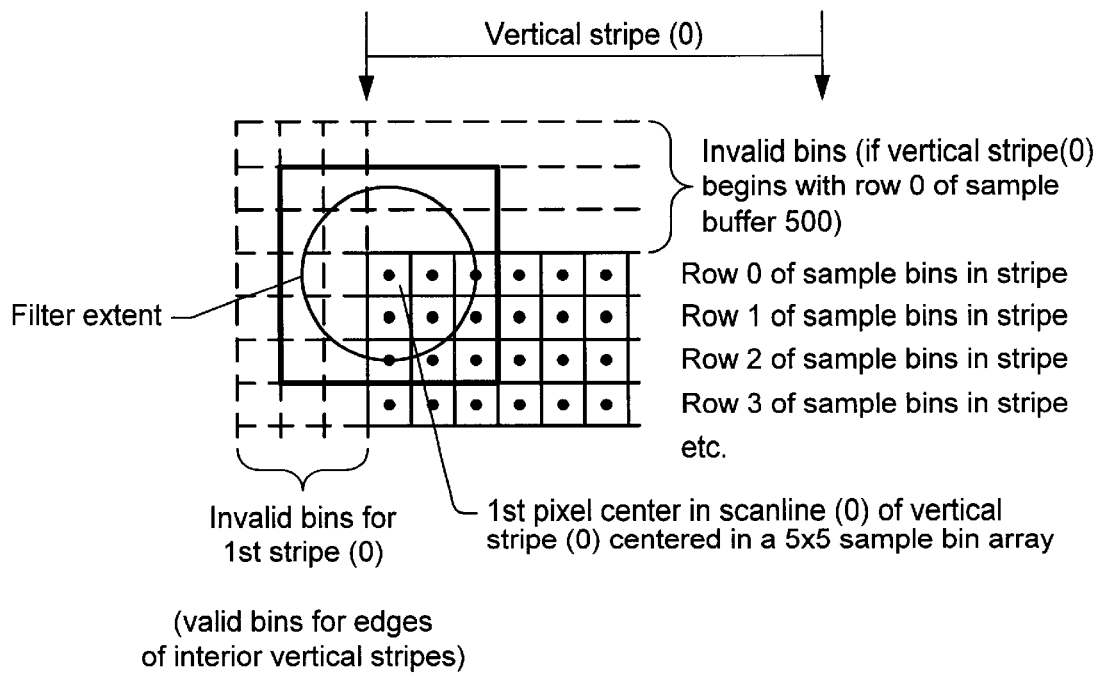
FIG. 19 illustrates the relationship between sample bins in a sample buffer and an N×N sample bin array.

In one set of embodiments, the specified portion of sample bins may be one of a set of vertical stripes of sample bins, wherein each vertical stripe may be a specified group of one or more contiguous columns of sample bins. The vertical stripe may exclude one or more rows of sample bins stored in the first memory 500. Sample bins adjacent to edges of the vertical stripe and from q sample bin columns and q sample bin rows next to the edges may also be stored in the bin scanline memory 520 and used to determine pixel values for pixels located in edge columns or edge rows of the vertical stripe as illustrated in FIG. 19. The number of adjacent rows and columns q may be specified by the functional relationship N=2q+1. Wherever the specified portion of sample bins extends to an edge of the sample space corresponding to the bins of the first memory 500, then there are no adjacent sample bins for that edge. However, one or more of the other edges of the specified portion of sample bins may still have adjacent sample bins, and they may be stored in bin scanline memory 520.

In some embodiments, the second memory 520 may have N+n rows (n being a non-negative integer). The method may then include copying a next n sequential rows of sample bins from the first memory 500 to n rows of the second memory 520 that do not contain valid sample data, while processing the N valid rows of sample data in the second memory 520. FIG. 19 illustrates a point in the process where invalid bins will be included in the third memory 560. A new row of bins in the second memory 520 may be marked valid as soon as the last bin in the new row is loaded. The oldest row of bins in the second memory 520 may be marked invalid as soon as a next pixel location is selected that no longer includes the oldest row in the set of N sequential rows that are approximately centered on the next pixel location. A method of circular rotation is used to select the next row in the second memory 520 and the next column in the third memory 560 for storing new sample bins.

In some embodiments, the third memory may have N+1 columns. The method may then include copying a next sequential column of sample bins from the second memory 520 to a column of the third memory 560 that does not contain valid sample data, while processing the N×N array of sample bins previously stored in the third memory 520.

In some embodiments, the method includes waiting to complete loading a new row to the second memory 520 before beginning to copy a first one or more sample bins from the new row to the third memory 560. In still other embodiments, the method may include anticipating the completion of loading a new row of sample bins from the first memory 500 to a row of the second memory. The method then initiates the copying of the first N sample bins from the new row of the second memory 520 to the corresponding row of the third memory 560 after a specified number of bins are loaded into the new row of the second memory 520.

The method may also include using the same samples in the third memory to determine pixel values for a first pixel location and a second pixel location when both reside in the same sample bin.

In some embodiments, the method includes determining pixel values by calculating a weighted sum of the sample values for one or more sample locations from each of the sample bins in the N×N sample bin array using weight coefficients corresponding to a specified filter function with a specified filter extent.

In these embodiments, the weight coefficients for invalid sample locations and invalid sample bins may be set equal to zero. Invalid sample locations are sample locations that are outside the specified filter extent, and invalid sample bins are sample bins that correspond to sample space locations that are outside the sample space defined by the sample bins in the first memory 500. Weight coefficients for each sample location may be determined by using a lookup table of values, stored in a filter weights memory 570 corresponding to a specified filter function. The specified filter function may be programmable, and may be selected from a set of filter functions including, but not limited to box filters, tent filters, square filters, and radial filters.

In some embodiments, the method may include processing sample values by determining a sample location within the N×N sample bin array that is closest to the pixel location and then assigning the sample values of the closest sample location to the pixel.

Numerous variations and modifications will become apparent to those skilled in the art once the above disclosure is fully appreciated. It is intended that the following claims be interpreted to embrace all such variations and modifications.

What is claimed is:

1. A graphics system comprising:

a first memory configured to store sample data in rows of sample bins, wherein sample data for one or more sample positions are stored in each sample bin and the rows of sample bins define a region in sample space;

a second memory configured to store P rows of sample bins copied from P sequential rows of the first memory from a specified portion of sample space, wherein N sequential rows of the P rows are approximately vertically centered on a selected pixel location in sample space, wherein N and P are positive integers, and wherein P is greater than or equal to N;

a third memory configured to store sample bins copied from N sequential columns of the N sequential rows of the second memory, wherein the sample bins contained in the N×N sample bin array are approximately centered on the selected pixel location in sample space;

a sample processor configured to determine pixel values for the selected pixel location by processing one or more sample values stored in the third memory; and a sample controller configured to select a sequence of pixel locations in sample space that corresponds to a sequence of pixels in a video data stream, and then for each pixel location in the sequence, executes a set of operations that comprises one or more of: a) reading sample data from one or more sequentially selected rows of sample bins from the first memory and storing said sample data in one or more corresponding rows of sample bins in the second memory, b) reading sample data from one or more sequentially selected columns of N sample bins from the second memory and storing said sample data in one or more corresponding columns of N sample bins in the third memory, so that for each pixel in the sequence, the N×N sample bin array is an array of sample bins that are approximately centered on the sample bin that contains the pixel location, c) initiates the determination of pixel values by the sample processor for the pixel location by processing the sample data stored in the sample bins of the N×N sample bin array, and d) outputting pixel data for inclusion in the video data stream.

2. The system of claim 1, wherein said video data stream is a real time video stream.

3. The system of claim 1, wherein the second memory, the third memory, the sample processor, and the sample controller are placed in close proximity on a single integrated circuit chip.

4. The system of claim 1, wherein the sample controller further comprises N sample loaders, wherein each sample loader is dedicated to one of the N rows of the second memory and a corresponding row of the third memory.

5. The system of claim 1, wherein the third memory is subdivided into two or more sub-memories and the sample processor is subdivided into two or more sub-processors, wherein each sub-processor is dedicated to process sample values stored in one of the sub-memories.

6. The system of claim 1, wherein the third memory is subdivided into $N^2$ sub-memories and the sample processor is subdivided into $N^2$ sub-processors, wherein each sub-memory stores the sample values for one of the sample bins of said N×N sample bin array, and each sub-processor is dedicated to process the sample values in a specific sample bin.

7. The system of claim 1, further comprising a pixel queue configured to store pixel values in a first-in first-out (FIFO) order and to send a stall signal to the sample controller if the pixel queue reaches a specified maximum number of stored pixel values.

8. The system of claim 7, wherein the sample controller is configured to a) receive the stall signal, b) interrupt the sample processor after all pixel locations in process are completed, and c) restart the sample processor when the pixel queue reaches a specified restart number of stored pixel values.

9. The system of claim 1, further comprising a filter weights memory for storing filter coefficients used to calculate a weighted average of the sample data stored in said N×N sample bin array.

10. The system of claim 1, further comprising a host computer for converting objects into representative polygons, a graphics processor for rendering the polygons into sample data and storing the sample data in the first memory, and a display unit for displaying the convolved pixel data.

11. The system of claim 10, further comprising a sample location memory A for storing an array of sample locations, wherein the graphics processor renders sample values for a specific array of sample locations and stores the sample values in the first memory.

12. The system of claim 11, further comprising a sample location memory B for storing an array of sample locations, wherein corresponding sample locations are read from the sample location memory B for each sample value and the sample values and corresponding locations are stored in the third memory.

13. A system comprising:
a sample buffer configured to store sample values for one or more sample locations in each sample bin of an array of sample bins;
a bin scanline memory configured to store sample values from the sample buffer for N+n sequential rows of sample bins from a specified portion of the sample buffer, wherein N is a positive integer and n is a non-negative integer;
a filter weights cache for storing filter coefficients used to calculate a weighted average of selected sample values;
a sample location cache for storing an array of sample locations, wherein a specific location corresponding to each sample value is selected from the array of sample locations;
a sample cache configured to store sample values and corresponding sample locations in a sample bin array comprising N columns and N rows of sample bins forming an N×N sample bin array that is approximately centered on a selected pixel location;
a sample processor configured to determine pixel values for the selected pixel location by calculating a weighted average of sample values for one or more sample locations in each sample bin in the N×N sample bin array; and
a sample controller configured to a) transfer sample data between the sample buffer and the bin scanline memory and between the bin scanline memory and the sample cache so that sample values and corresponding sample locations are stored in sample bins within the sample cache such that the sample bins combine to form the N×N sample bin array that is approximately centered on a sample bin that contains the selected pixel location, b) initiate the determination of pixel values by the sample processor, c) output the pixel values, d) identify the next pixel location in a video data stream, and e) repeat a) through d) for the next pixel location.

14. The system of claim 13, wherein the sample controller comprises N sample loaders, wherein each sample loader is dedicated to one of the N rows of the sample cache, and is configured to receive sample data from any one of the N+n rows of the bin scanline memory.

15. The system of claim 13, wherein the sample cache is subdivided into $N^2$ sub-caches and the sample processor is subdivided into $N^2$ sub-processors, wherein each sub-cache stores the sample values for one of the sample bins of said N×N sample bin array, and each sub-processor is dedicated to process the sample values in a specific sample bin.

16. The system of claim 13, further comprising a video output unit and a display, wherein the video output unit is configured to receive the pixel values, convert the pixel values to a video signal, and output the video signal to the display.

17. A method for generating pixel data for a video data stream, comprising:
determining a location in sample space for a next pixel in a video data stream;
identifying N sequential rows of sample bins in sample space that are approximately vertically centered on the pixel location, wherein N is a positive integer;
copying sample bins from a specified portion of one or more of said N sequential rows of sample bins from a first memory to a second memory so that the second memory contains copies of the specified portion of each of said N sequential rows of sample bins;
identifying a specific N×N sample bin array that is approximately centered on the pixel location;
copying sample bins from one or more columns of said N sequential rows from the second memory to a third memory to form a sample bin array that contains copies of each of the sample bins that combine to form said specific N×N sample bin array;
determining pixel values for the pixel location by processing sample data for one or more of the sample locations stored in each of the sample bins of the N×N sample bin array; and
outputting the pixel values.

18. The method of claim 17, further comprising storing the pixel values in a pixel queue and outputting pixel values from the pixel queue to a real time video stream.

19. The method of claim 17, wherein said sample data comprise one or more of sample location, color values, transparency value, and depth.

20. The method of claim 17, wherein the first memory is a multi-sample frame buffer comprising sample bins with one or more samples per bin, and wherein the samples and the sample bins are located in sample space.

21. The method of claim 17, wherein the specified portion of sample bins of the first memory is one of a set of vertical stripes of sample bins, wherein each vertical stripe is a specified group of one or more contiguous columns of sample bins, wherein sample bins from q adjacent sample bin columns and q adjacent sample bin rows next to a vertical stripe edge are also stored in the bin scanline memory and used to determine pixel values for pixels located in edge columns of the vertical strip, except when the specified portion of sample bins extends to an edge of the first memory, and wherein q is a non-negative integer.

22. The method of claim 17, wherein a method of circular rotation is used to select the next row in the second memory and the next column in the third memory for storing new sample bins.

23. The method of claim 17, further comprising copying a next n sequential rows of sample bins from the first memory to n rows of the second memory that do not contain valid sample data, while processing the N valid rows of sample data in the second memory, wherein the second memory has N+n rows, and wherein n is a non-negative integer.

24. The method of claim 17, further comprising copying a next sequential column of sample bins from the second memory to a column of the third memory that does not contain valid sample data, while processing the N×N array of sample bins previously stored in the third memory, wherein the third memory has N+1 columns.

25. The method of claim 17, wherein copying a row of sample bins from the first memory to a specific row of the second memory is completed before a first one or more sample bins from the specific row of the second memory is copied to the third memory.

26. The method of claim 17, wherein a first one or more sample bins from a specific row of the second memory is copied to the third memory before the entire row of sample bins is completely copied from the first memory to the specific row of the second memory.

27. The method of claim 17, further comprising determining pixel values for a second pixel location that resides in a sample bin that also contains a first pixel location, wherein the pixel values for the second pixel location are determined by processing same sample values in the third memory for the second pixel location.

28. The method of claim 17, wherein pixel values are determined by calculating a weighted sum of the sample values for one or more sample locations from each of the sample bins in the N×N sample bin array using weight coefficients for a specified filter function with a specified filter extent.

29. The method of claim 28, wherein the weight coefficients for invalid sample locations and invalid sample bins are set equal to zero, wherein invalid sample locations are sample locations that are outside the specified filter extent, and invalid sample bins are sample bins that correspond to sample space locations that are outside the sample space defined by the sample bins in the first memory.

30. The method of claim 28, wherein the weight coefficients for each sample location are determined by using a table of values stored in a filter weights memory for a specified filter function that is centered on the pixel location.

31. The method of claim 30, wherein the specified filter function is selected from a set of filter functions comprising: box filters, tent filters, square filters, and radial filters.

32. The method of claim 17, wherein said processing sample values is achieved by determining a sample location within the N×N sample bin array that is closest to the pixel location and then assigning the sample values of the closest sample location to the pixel.

* * * * *